(12) United States Patent
Dehghanian et al.

(10) Patent No.: US 9,977,113 B2
(45) Date of Patent: May 22, 2018

(54) METHOD OF DETERMINING POSITION AND COOPERATIVE POSITIONING SYSTEM USING SAME

(71) Applicant: ZEROKEY INC., Calgary (CA)

(72) Inventors: Vahid Dehghanian, Calgary (CA); Matthew Lowe, Calgary (CA)

(73) Assignee: ZEROKEY INC. (CA)

( * ) Notice: Subject to any disclaimer, the term of this patent is extended or adjusted under 35 U.S.C. 154(b) by 0 days. days.

(21) Appl. No.: 15/339,885

(22) Filed: Oct. 31, 2016

(65) Prior Publication Data

US 2017/0123044 A1 May 4, 2017

Related U.S. Application Data

(60) Provisional application No. 62/248,131, filed on Oct. 29, 2015.

(51) Int. Cl.
*G01S 5/02* (2010.01)
*H04B 17/318* (2015.01)
*G01C 21/20* (2006.01)

(52) U.S. Cl.
CPC .......... *G01S 5/0263* (2013.01); *G01C 21/206* (2013.01); *G01S 5/0289* (2013.01); *H04B 17/318* (2015.01)

(58) Field of Classification Search
CPC ............ H04W 16/14; H04W 72/0453; H04W 72/082; H04W 24/02; H04W 72/04; H04W 28/18; H04W 16/10; H04W 72/048; H04W 28/16; H04W 72/0486; H04W 28/0231; H04W 52/343; H04W 72/00; H04W 72/0446
See application file for complete search history.

(56) References Cited

U.S. PATENT DOCUMENTS

2013/0018629 A1* 1/2013 Sidhu .................. G01C 21/165
702/150
2013/0103200 A1* 4/2013 Tucker ................ G01C 21/206
700/275

* cited by examiner

*Primary Examiner* — Kwasi Karikari
(74) *Attorney, Agent, or Firm* — Daniel R. Polonenko

(57) ABSTRACT

A positioning system is disclosed. The positioning system has a map database, a processing engine and a plurality of wireless communication devices including at least a first wireless communication device at a known position and a second wireless communication device at an unknown position. The processing engine determines the position of the second device based on the RSS measurements of a wireless signal transmitted between the first and second devices, the inertial measurements from the second device and the position of the first wireless communication device.

22 Claims, 5 Drawing Sheets

METHOD OF DETERMINING POSITION AND COOPERATIVE POSITIONING SYSTEM USING SAME

CROSS-REFERENCE TO RELATED APPLICATIONS

This application claims the benefit of U.S. Provisional Patent Application Ser. No. 62/248,131, filed Oct. 29, 2015, which is incorporated herein by reference in their entirety.

FIELD OF THE DISCLOSURE

The present invention relates generally to positioning systems, and in particular to a method of determining relative and/or absolute position.

BACKGROUND

Many positioning systems are known, for instance, the Global Positioning System (GPS) is widely used to determine the position of vehicles, aircraft, pedestrians, etc. However, these systems have limitations which prevent their use in many scenarios. One such scenario is the case of indoor positioning, where line-of-sight to GPS satellites is obstructed by the building structure. Many other scenarios, such as those requiring high accuracy, also prove problematic with existing positioning systems. Typical accuracy of consumer positioning systems is about 10 meters.

Therefore, it is desired to provide novel positioning systems and methods capable of providing high accuracy in indoor environments.

SUMMARY

Herein, we describe a method of calculating position and a positioning system using two or more wireless communication devices, hereafter referred to as nodes. With one or more of the nodes having Received Signal Strength (RSS) measuring capability and one or more of the mobile nodes having an Inertial Measurement Unit (IMU).

Normally, positioning based on RSS measurements is not sufficiently accurate for most applications. With the method and algorithms described herein, we disclose a new method and a positioning system applicable to portable wireless devices, including but not limited to, smartphones, tablets, laptops, et cetera. The methods disclosed combine RSS measurements as well as measurements from other ancillary sensors, e.g. accelerometer, barometer, magnetometer, etc. available in all or a subset of the system nodes, ultimately, providing position data with significantly improved accuracy.

DETAILED DESCRIPTION

Figure 1:
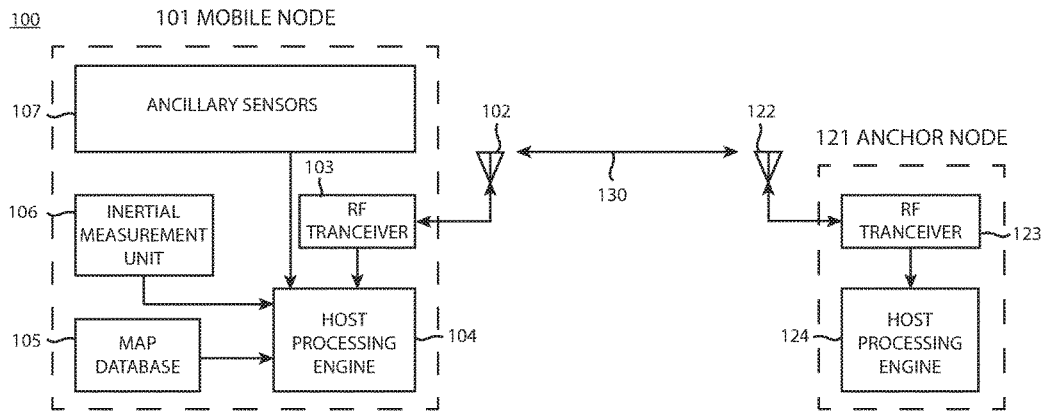
FIG. 1 shows the general architecture of the disclosed positioning method.

Referring to FIG. 1, the positioning system 100 disclosed herein comprises one or more wireless communications units at known or predetermined locations (denoted as anchor nodes or fixed nodes) 121, one or more portable wireless communications units (denoted as mobile nodes) 101, one or more host processing engines 104, and a map database 105 containing map and anchor node position information.

The mobile nodes 101 are equipped with RSS measuring capability. One or more of the mobile nodes are equipped with one or more ancillary sensors, including but not limited to, one or more inertial sensors 106. The system determines the positions of the mobile nodes 101 based on RSS information corresponding to an RF communication 130 from the fixed nodes 121, inertial sensor 106 measurements, and the map database 105.

Figure 2:
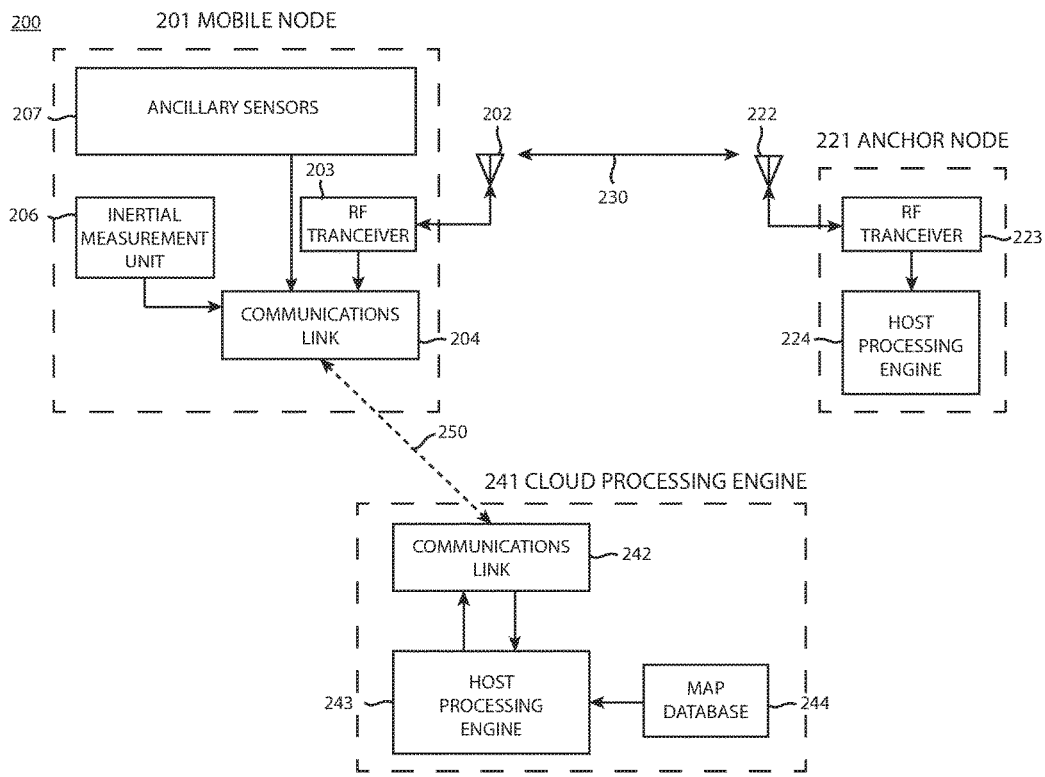
FIG. 2 shows one embodiment of the present disclosure with a cloud processing engine.

In this embodiment the host processing engine is in the form of a microprocessor 104. In some embodiments, as shown in FIG. 2, the host processing engine 243 is in the form of a cloud-based processing engine (such as Amazon EC2). In other embodiments, the host processing engine is a centralized processing engine such as a personal computer, dedicated server, or in the form of multiple distributed processing units on all or some of the nodes. The map database 105 is stored in memory accessible to the processing engine(s), such as in RAM, ROM, flash memory, hard drive, cloud-based storage (e.g. Amazon S3).

The RSS measurement observed at node k due to RF transmission 130 made by node l, is denoted here as $\bar{z}_{kl}$. RSS measurement(s) are used to determine coarse position of mobile nodes. For example, if node k is a smartphone capable of measuring RSS due to RF transmissions made by node l, with known position, the distance between nodes k and l, denoted as $d_{kl}$, can be found from the pathloss model as $$d_{kl} = 10^{(z_l(dBm) - \bar{z}_{kl}(dBm))/(10\gamma)} \quad (1)$$

where $\gamma$ is the pathloss exponent, $z_l(dBm)$ is the measured RSS of the RF signal transmitted by node l at a reference distance of 1 m in decibels milliwatt (dBm), which may be determined during calibration. Those skilled in the art appreciate that, if $z_l(dBm)$ is measured at a distance other than 1 m, equation (1) must be adjusted accordingly. In this embodiment, $\gamma$ is estimated during calibration. In some embodiments, the RSS-based location algorithm estimates $\gamma$. Those skilled in the art appreciate that the estimation of $\gamma$ may be achieved through a variety of known methods, such as Least Squares (LS) methods.

The Euclidean distance between nodes k and l on a two-dimensional surface (e.g. floor of a building) is related to node coordinates $x_k, y_k, x_l, y_l$ (with reference to a local and/or a global coordinate system) as $$d_{kl} = \sqrt{(x_k - x_l)^2 + (y_k - y_l)^2} \quad (2)$$

In some embodiments, a nominal position, denoted here as $\tilde{x}_k, \tilde{y}_k$, is assigned to mobile node k. Nominal positions are previously known positions of mobile nodes. In some embodiments, nominal positions are projected positions predicted from inertial sensor measurements or from other ancillary sensors 107 available in mobile nodes. In other embodiments, nominal positions are estimated using any singular implementation or combination of known RSS positioning methods, e.g. proximity-based methods.

In some embodiments, mobile node positions are calculated according to the steps described below.

All or a subset of RSS measurements may be used to calculate the nominal range between nodes k and l as $$\tilde{d}_{kl} = \sqrt{(\tilde{x}_k - x_l)^2 + (\tilde{y}_k - y_l)^2} \quad (3)$$

Calculate the difference between nominal range $\tilde{d}_{kl}$ and RSS range estimate $d_{kl}$ as $$\Delta_{kl} = \tilde{d}_{kl} - d_{kl} \quad (4)$$

Calculate $$A_{kl} = [(\tilde{x}_k - x_l)/\tilde{d}_{kl} (\tilde{y}_k - y_k)/\tilde{d}_{kl}] \quad (5)$$

Calculate mobile node position(s) as $$\hat{x}_k = \tilde{x}_k + \delta x_k$$

$$\hat{y}_k = \tilde{y}_k + \delta y_k \quad (6)$$

where $\delta x_k = [\delta X]_k$ and $\delta y_k = [\delta Y]_k$, and $$[\delta X \delta Y] = (A^T A)^{-1} A^T \Delta \quad (7)$$

and $[\Delta]_{kl} = \Delta_{k1}$, $[A]_{kl} = A_{kl}$ from equations (4) and (5), respectively.

In some embodiments, anchor nodes are equipped with RSS measuring capability and mobile node positions are estimated based on the RSS measurements made at all or a subset of anchor nodes. In other embodiments, RSS measurement capability is enabled in all or a subset of mobile and anchor nodes.

RSS measurements are associated with unique identifiers representing the source node of the RF transmission (e.g. MAC address). In some embodiments, nominal node positions are determined by the position of the closest node(s) with known position(s). For example, RSS values measured at node k, over a period of τ seconds, will be searched to determine the unique identifiers (e.g. the MAC address) of the node associated with the largest RSS value. If, for example, the largest RSS value measured by node k belongs to node l, the known position of node l can be used as the nominal position of node k i.e. $\tilde{x}_k = x_l$ and $\tilde{y}_k = y_l$.

In other embodiments, if the largest RSS measurement made at node k is associated with wireless transmission made by node l, and this value is larger than a predetermined threshold, nodes k and l may be considered to be collocated i.e. $x_k = x_l$ and $y_k = y_l$.

In some embodiments, the mobile node k is a smartphone participating on a WiFi network.

In other embodiments, the mobile node k is a smartphone receiving Bluetooth® signals transmitted by other nodes.

In some embodiments, the mobile node k is a smartphone measuring RSS of Bluetooth® and WiFi signals transmitted by other nodes.

Those skilled in the art appreciate that a variety of RSS-based position estimation methods are known, such as, proximity-based, differential RSS, fingerprinting, multilateration, etc. and may be used interchangeably.

In some embodiments, where RSS fingerprinting is used to determine coarse node positions, the RSS fingerprint map is produced based on an initial calibration.

In other embodiments, where RSS fingerprinting is used to determine coarse node positions, computed positions and observable sensor data are relayed to the processing engine to refine and update the RSS fingerprint map.

Mobile nodes are equipped with at least one inertial measurement unit and may include other ancillary sensors including but not limited to, magnetometer, barometer, lux meter, temperature sensor, camera, et cetera. The host processing engine fuses RSS measurements with ancillary sensor measurements to improve positioning accuracy.

In some embodiments, RSS-based position estimates are used to correct for inertial sensor errors, e.g. bias and bias drift, thereby providing improved positioning accuracy. One implementation of such sensor fusion is described below.

IMU measurements at mobile nodes are used to estimate mobile node attitudes. Accelerometer measurements are generally made with reference to the body frame. Mobile node attitudes may be used to transform acceleration information to the navigation frame, also known as the local level frame (LLF). Those skilled in the art, appreciate that a variety of vector coordinate transformations are commonly used in navigation systems and embodiments herein are not limited to use of any particular frame. For simplicity of notation and as a non-limiting example, LLF is assumed hereafter.

Let $a_k$ denote the vector acceleration associated with IMU measurements of node k. Also, let $\delta\dot{\theta}_k$, $\delta\dot{v}_k$, and $\delta\dot{a}_k$ denote the time rate of change of the 2D vector position error $\delta\theta_k = [\delta x_k \ \delta y_k]$, velocity error, and accelerometer error associated with node k such that $$\delta\dot{\theta}_k = \delta v_k$$

$$\delta\dot{v}_k = \delta a_k \quad (8)$$

In this embodiment, accelerometer errors are modeled using a first order Markov process as $$\delta\dot{a}_k = -\alpha_k \delta a_k + \sqrt{2\alpha_k \sigma_k^2} w_k \quad (9)$$

where $\alpha_k$ is the reciprocal of the correlation time of the Markov process, $\sigma_k^2$ is the variance of the white noise associated with the process, and $w_k$ is the 2×1 uncorrelated White Gaussian Noise vector (WGN) of unit covariance.

An error state equation can be given for node k as $$\begin{bmatrix} \delta\dot{\theta}_k \\ \delta\dot{v}_k \\ \delta\dot{a}_k \end{bmatrix} = \begin{bmatrix} 0_2 & 1_2 & 0_2 \\ 0_2 & 0_2 & 1_2 \\ 0_2 & 0_2 & -\alpha_k 1_2 \end{bmatrix} \begin{bmatrix} \delta\theta_k \\ \delta v_k \\ \delta a_k \end{bmatrix} + W_k \quad (10)$$

$$\underbrace{\phantom{xxx}}_{\dot{x}_k} \quad \underbrace{\phantom{xxxxxxxxxxxx}}_{A_k} \quad \underbrace{\phantom{xxx}}_{x_k}$$

where $0_2$, and $1_2$ are 2×2 matrices of zeros and ones, respectively, and $$W_k^T = [0,0,0,0, w_k^T \sqrt{2\alpha_k \sigma_k^2}]$$

For the system with $K_I$ such nodes, the KF state equation may be expressed in matrix form as $$\dot{X} = AX + W \quad (11)$$

where $X^T = [x_1, \ldots, x_{K_I}]$, $W^T = [W_1, \ldots, W_{K_I}]$, and $$A = \begin{bmatrix} A_1 & \cdots & 0 \\ \vdots & \ddots & \vdots \\ 0 & \cdots & A_{K_I} \end{bmatrix}$$

where 0 denotes a 6×6 matrix of zeros.

A KF state propagation equation in discrete form is then given as $$x[n|n-1] = \Phi x[n-1|n-1] \quad (12)$$

where $$\Phi = \exp(A\Delta t_n) \cong (I_{6K_I} + A\Delta t_n) \quad (13)$$

where $I_{6K_I}$ is a $6K_I \times 6K_I$ identity matrix and $\Delta t_n$ is the elapsed time between n−1 and n samples. The accuracy of state prediction at each step is quantified by the state propagation covariance P as $$P[n|n-1] = \Phi P[n-1|n-1]\Phi + Q \quad (14)$$

where Q is the $6K_I \times 6K_I$ diagonal matrix of noise covariance with the 6 diagonal elements associated with node k given as $$Q_{diag}\{k:k+6\} \cong \Delta t_n[0,0,0,0,2\alpha_k\sigma_k^2, 2\alpha_k\sigma_k^2] \quad (15)$$

Let $\theta^{LS}$ denote the LS estimate vector of the mobile node positions. The indirect Kalman Filter measurement equation is given as $$\Psi[n] = \theta^{LS}[n] - \theta[n|n-1] = Hx + \eta \quad (16)$$

where $H = I_{K_I} \otimes [1,1,0,0,0,0]$, where $\otimes$ denotes a Kronecker product and $\eta$ is the uncorrelated RSS measurement noise with the covariance $R = E[\eta\eta^H] = \sigma_{dB}^2 I$. The state variables are now updated to incorporate the RSS measurements as $$x[n|n] = x[n|n-1] + K[\Psi[n] - Hx[n|n-1]] \quad (17)$$

where K is the Kalman gain given as $$K = P[n|n-1]H^T(HP[n|n-1]H^T + R)^{-1} \quad (18)$$

The accuracy of the Kalman Filter update is depicted in the prediction covariance which is given as (the Joseph form)

$$P[n|n] = [I - KH]P[n|n-1][I - KH]^T + KRK^T \quad (19)$$

Finally, the updated positions are $$\theta_k[n] = \theta_k^{INS}[n] + \delta\theta_k[n|n] \quad (20)$$

where $\theta_k^{INS}[n]$ is the 2D position of mobile node k from INS.

Those skilled in the art appreciate that, in alternative embodiments, various Bayesian methods such as particle filter, other forms of Kalman Filter, etc. may be used for fusing IMU data with RSS measurements.

In some embodiments, ancillary sensor data, e.g. inertial sensor outputs, are relayed to the processing engine along with the RSS measurements.

In some embodiments, RSS is measured at anchor nodes, and coarse mobile node position based on those RSS measurements are relayed to the mobile node. The mobile node fuses the provided coarse position with its ancillary sensor (including IMU) measurements to improve location accuracy.

In some embodiments, the RF communication data is not relayed to the processing engine, and coarse node position(s) are computed locally at nodes. In other embodiments the RF communication data contains the position of the transmitting anchor node.

In other embodiments, the position of the transmitting anchor node is embedded in the transmitted wireless communication data.

In another embodiment, ancillary sensor data is continuously stored in memory until it is relayed to the processing engine in addition to the RSS measurements.

In some embodiments, ancillary sensor information will be preprocessed in some nodes and only state variables of interest will be sent to the processing engine. For example, each mobile node may process its IMU and magnetometer sensor outputs to estimate user heading and the number of steps taken between RSS measurements.

In one embodiment, a pedestrian dead reckoning (PDR) algorithm is first utilized to determine position information from IMU data. Generally speaking, PDR methods estimate user position relative to an initially known position based on: pedestrian's stride length, number of steps taken since the initial position, and the heading information extracted from an electronic compass on the mobile device. Those skilled in the art appreciate that various PDR methods are known and have been integrated to athletic wearables such as Garmin Phenix 3®.

Figure 6:
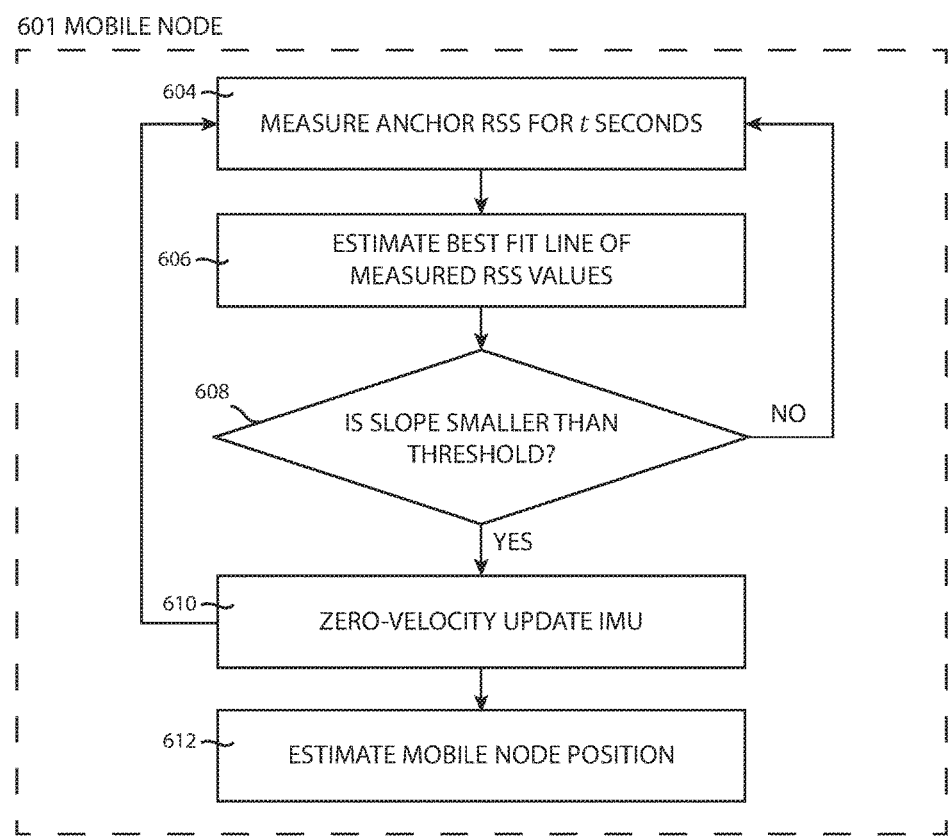
FIG. 6 shows another embodiment in which RSS measurements are used to detect when a node is stationary and trigger zero-velocity update (ZUPT) of an inertial sensor.

In another embodiment of the current disclosure described in FIG. 6, one or more mobile nodes measure multiple successive RSS values due to transmissions made by one or more anchor nodes for a period of t seconds in step 604. In step 606, the measured RSS values associated with each anchor node, in dBm, is then processed to determine the state of the mobile phone i.e. whether it is stationary or moving. As a non-limiting example, mobile node k measures and stores RSS values corresponding to one or more anchor nodes over a period of time t. A line is fitted to each set of successive RSS measurements corresponding to each anchor node. A heuristic approach 608, whereby if the slope(s) of line(s) or the average of slopes of lines fitted to RSS measurements from various anchors is less than a given threshold µ, a zero-velocity update is triggered 610 in order to correct IMU sensor errors at node k. Finally, the mobile node's position is estimated utilizing the corrected IMU data at 612. Those skilled in the art appreciate that IMU error correction methods based on various ZUPT algorithms are known, e.g. for GPS-INS integration. Those skilled in the art, appreciate that various binary/M-ary hypothesis testing methods can be used to determine the state of mobile nodes i.e. moving/stationary, based on known hypothesis testing methods such as Neyman Pearson.

In one embodiment of the current disclosure, the anchor nodes of the system may not be equipped with inertial sensing functionality. They may not possess information about their fixed position. They may not possess RSS measurement capability.

In another embodiment, the anchor nodes manage the wireless communication between nodes.

In one embodiment, RSS measurements are first processed using a traditional position location algorithm such as triangulation or Least Squares to derive position from RSS measurements. This information is then directly fused with inertial sensor data to improve position location accuracy.

In an embodiment of the current disclosure, the nodes share timing information such as the start and/or end times of each measurement.

Figure 3:
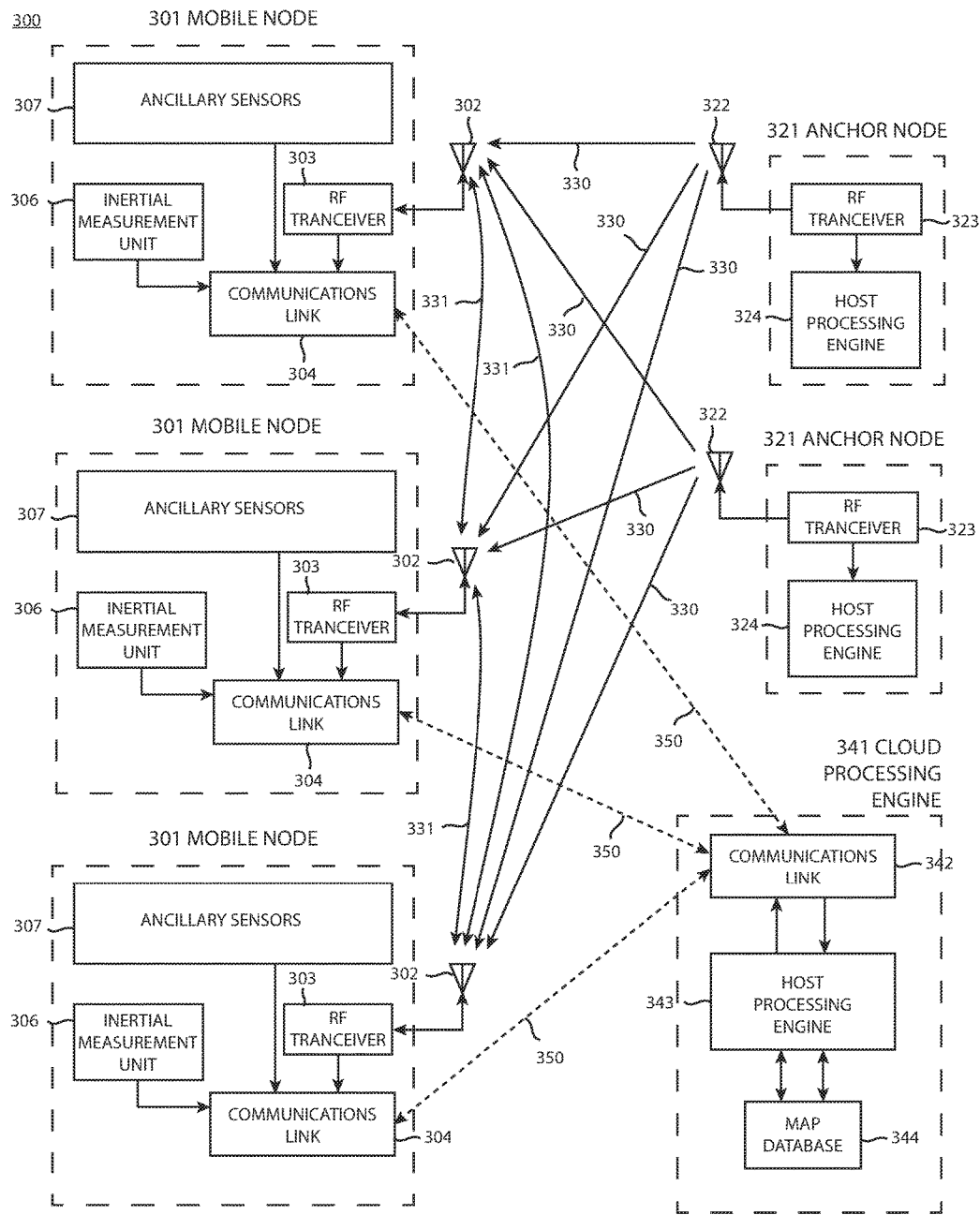
FIG. 3 shows an embodiment of the disclosed cooperative positioning system in which three mobile nodes measure RSS amongst themselves and two anchor nodes, which is processed by a cloud processing engine.
Figure 4:
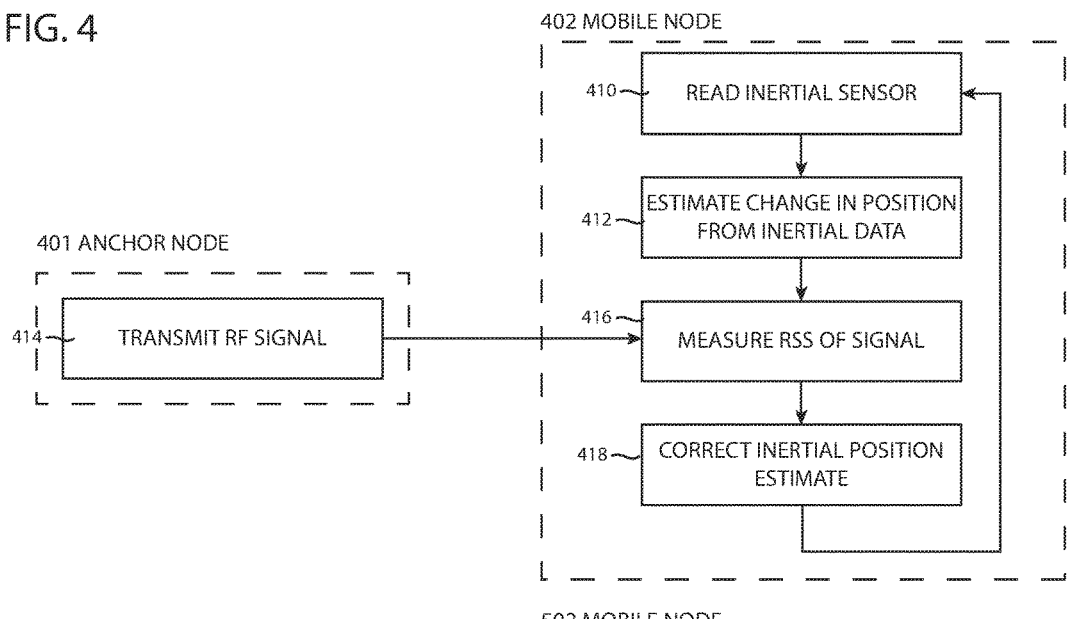
FIG. 4 shows a flowchart of the measurement process in some embodiments of the system.
Figure 5:
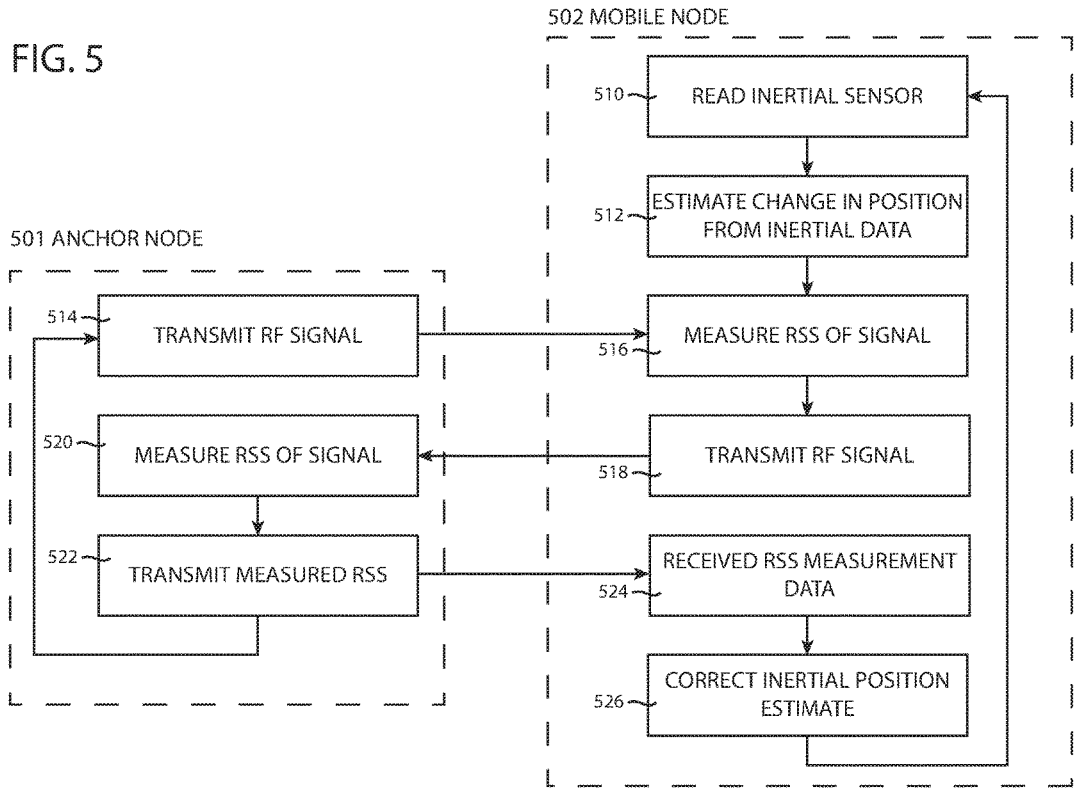
FIG. 5 shows a flowchart of the measurement process in an embodiment of the system where anchor nodes and mobile nodes cooperate to obtain RSS measurements.
Figure 7:
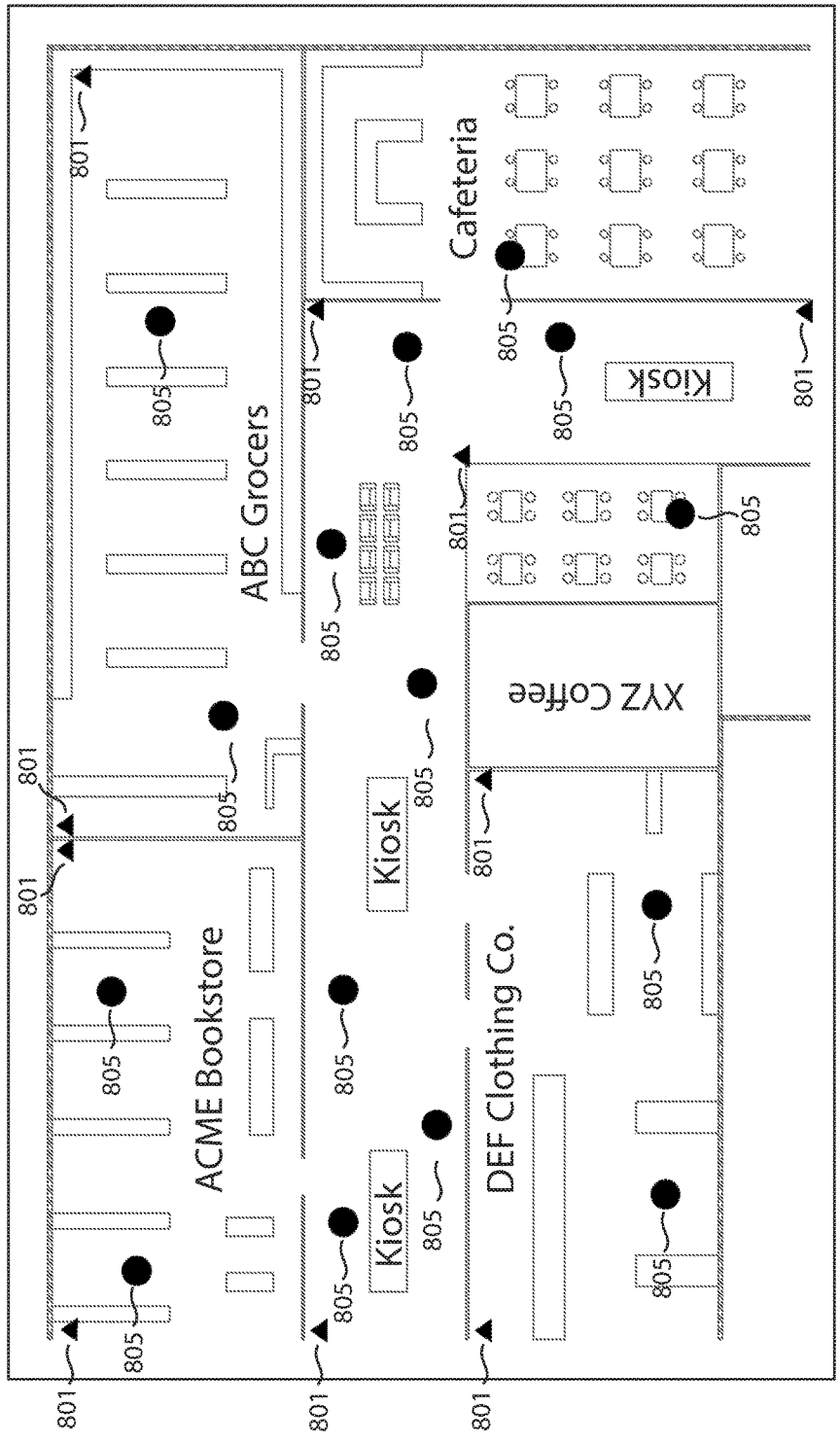
FIG. 7 shows an embodiment of the disclosed cooperative positioning system with multiple anchor and mobile nodes in a shopping center scenario.

In some embodiments, a cooperative positioning system is implemented as shown in FIG. 3. Such cooperative positioning system is particularly useful, but not limited to, in shopping centres with moderate to high node traffic as shown in FIG. 7. As a non-limiting example, equations (1) to (7) are used to process all or a subset of RSS measurements made at two or more nodes. The output of such RSS cooperative localization includes, but is not limited to, mobile node positions, which may then be relayed to individual nodes for fusion with ancillary sensor measurements (including inertial sensors).

In another embodiment of the current disclosure, some or all of the nodes are equipped with barometric pressure sensors for determining node altitudes.

In one embodiment, some or all of the nodes are equipped with magnetic sensing functionality for determining mobile node heading.

In one other embodiment of this disclosure, sensor measurements will be sorted based on their relative accuracy and only high quality measurements will be considered for positioning. That is, the sensor data is captured and assessed for accuracy based on their corresponding signal to noise ratio, variance, etc. Only a subset of more reliable measurements will be considered for further processing.

In one embodiment of the current disclosure, the positioning algorithm is aided by context aware constraints, such as map information on the location of walls and non-traversable terrain, or motion constraint information such as step length of the person carrying a mobile node, etc.

Although embodiments have been described above with reference to the accompany drawings, those of skill in the art will appreciate that variations and modifications may be made without departing from the scope thereof as defined by the appended claims.

What is claimed is:

1. A positioning system comprising:
a plurality of wireless communication devices comprising at least one first wireless communication device at a known position and a second wireless communication device at an unknown position, the second wireless communication device comprising an inertial measurement unit for providing inertial measurements, the second wireless communication device in wireless communication with the at least one first wireless communication device via one or more wireless signals;
a map database, the map database comprising calibration data, the calibration data comprising at least an RSS fingerprint; and
a processing engine functionally coupled to at least one of the plurality of wireless communication devices and the map database, the processing engine acting for
receiving received signal strength (RSS) measurements of the one or more wireless signals,
receiving the inertial measurements from the inertial measurement unit, and
calculating the position of the second device wireless communication by fusing the RSS measurements, the inertial measurements and the position of the first wireless communication device.

2. The system of claim 1 wherein said calculating the position of the second wireless communication device comprises calculating the position of the second wireless communication device using a Bayesian algorithm.

3. The system of claim 1 wherein said calculating the position of the second wireless communication device comprises using the RSS measurements to correct the errors of the inertial measurement.

4. The system of claim 1 wherein the processing engine is in one of the plurality of wireless communication devices.

5. The system of claim 1 wherein the processing engine is in one or more computing devices in communication with the plurality of wireless communication devices via a network.

6. The system of claim 1 wherein the processing engine further acts for updating the calibration data of the map database using received RSS measurements and the calculated position of the second wireless communication device.

7. The system of claim 1 wherein the processing engine further acts for determining position information of the second wireless communication device from the inertial measurements using a pedestrian dead reckoning algorithm.

8. The system of claim 1 further comprising:
a plurality of wireless communication devices of unknown position, wherein devices of unknown position cooperatively perform RSS measurements between other wireless devices of unknown position.

9. The system of claim 4 wherein the output of the processing engine is relayed to other wireless devices and utilized as positioning inputs for future position calculations.

10. The system of claim 1 wherein the wireless devices communicate timestamped measurement data to the processing engine.

11. The system of claim 1 wherein a Neyman-Pearson algorithm is used to detect zero velocity and perform a zero-velocity update calibration of the inertial sensor(s).

12. The system of claim 1 further comprising:
a database of adjustment factors coupled to the processing engine;
wherein the processing engine determines a corrective factor based on source wireless device hardware brand or model and applies the adjustment factor to RSS measurements prior to determining position.

13. The system of claim 1 further comprising:
zero or more proximity wireless devices;
a map database containing proximity wireless device locations coupled to the processing engine.

14. The system of claim 3 wherein said calculating the position of the second wireless communication device comprises calculating the position of the second wireless communication device using a Kalman filter.

15. A method for determining a position of a mobile wireless communication device, the method comprising:
storing calibration data in a map database, the calibration data comprising at least an RSS fingerprint;
obtaining a first set of received signal strength (RSS) measurements of one or more wireless signals transmitted between the mobile wireless communication device and one or more reference wireless communication devices located at known positions;
obtaining a second set of measurements related to the position of the mobile wireless communication device; and
calculating the position of the mobile wireless communication device by fusing the first and second sets of measurements, and the known positions of the one or more reference wireless communication devices.

16. The method of claim 15 wherein said calculating the position of the mobile wireless communication device comprises:
calculating a position estimate of the mobile wireless communication device using one set of the first and second sets of measurements;
calculating the position of the mobile wireless communication device by correcting the calculated position estimate using the other set of the first and second sets of measurements.

17. The method of claim 15 wherein said calculating the position of the mobile wireless communication device comprises calculating the position of the mobile wireless communication device using a Bayesian algorithm.

18. The method of claim 15 further comprising:
updating the calibration data of the map database using the first set of RSS measurements and the calculated position of the mobile wireless communication device.

19. A computer-readable storage device comprising computer-executable instructions for determining a position of a mobile wireless communication device, wherein the instructions, when executed, cause a processing engine to perform actions comprising:

storing calibration data in a map database, the calibration data comprising at least an RSS fingerprint;

obtaining a first set of received signal strength (RSS) measurements of one or more wireless signals transmitted between the mobile wireless communication device and one or more reference wireless communication devices located at known positions;

obtaining a second set of measurements related to the position of the mobile wireless communication device;

calculating the position of the mobile wireless communication device by fusing the first and second sets of measurements, and the known positions of the one or more reference wireless communication devices; and updating the calibration data of the map database using the first set of RSS measurements and the calculated position of the mobile wireless communication device.

20. The computer-readable storage device of claim 19 wherein said obtaining a second set of measurements related to the position of the mobile wireless communication device comprises obtaining a set of inertial measurements of the mobile wireless communication device.

21. A mobile wireless communication device comprising:
a wireless communication component for communication, via one or more wireless signals, with one or more reference wireless communication devices located at known positions;

at least one ancillary sensor for providing sensor measurements related to the position of the mobile wireless communication device;

a map database, the map database comprising calibration data, the calibration data comprising at least an RSS fingerprint; and a processing engine functionally coupled to the wireless communication component and the at least one ancillary sensor, the processing engine acting for:

obtaining received signal strength (RSS) measurements of the one or more wireless signals;

obtaining the sensor measurements from the at least one ancillary sensor;

calculating the position of the mobile wireless communication device by fusing the RSS measurements, the sensor measurements, and the known positions of the one or more reference wireless communication devices; and updating the calibration data of the map database using the first set of RSS measurements and the calculated position of the mobile wireless communication device.

22. The mobile wireless communication device of claim 21 wherein the at least one ancillary sensor comprises an inertial measurement unit, and wherein the sensor measurements comprise inertial measurements provided by the inertial measurement unit.

\* \* \* \* \*